(12) United States Patent
Wischnewskiy et al.

(10) Patent No.: US 9,385,635 B2
(45) Date of Patent: Jul. 5, 2016

(54) ULTRASONIC MOTOR

(75) Inventors: Wladimir Wischnewskiy, Waldbronn (DE); Alexej Wischnewskij, Woerth (DE)

(73) Assignee: Physik Instrumente (PI) GmbH & Co. KG, Karlsruhe (DE)

( * ) Notice: Subject to any disclaimer, the term of this patent is extended or adjusted under 35 U.S.C. 154(b) by 497 days.

(21) Appl. No.: 14/000,926

(22) PCT Filed: Feb. 22, 2012

(86) PCT No.: PCT/DE2012/000011
§ 371 (c)(1),
(2), (4) Date: Sep. 19, 2013

(87) PCT Pub. No.: WO2012/113394
PCT Pub. Date: Aug. 30, 2012

(65) Prior Publication Data
US 2014/0001922 A1  Jan. 2, 2014

(30) Foreign Application Priority Data

Feb. 22, 2011 (DE) .......................... 10 2011 011 992
Dec. 6, 2011 (DE) .......................... 10 2011 087 801

(51) Int. Cl.
*H02N 2/00* (2006.01)
*H01L 41/09* (2006.01)
*H02N 2/06* (2006.01)
*H02N 2/02* (2006.01)
*H02N 2/10* (2006.01)

(52) U.S. Cl.
CPC ................. *H02N 2/06* (2013.01); *H02N 2/005* (2013.01); *H02N 2/006* (2013.01); *H02N 2/0055* (2013.01); *H02N 2/0075* (2013.01); *H02N 2/026* (2013.01); *H02N 2/103* (2013.01)

(58) Field of Classification Search
USPC .................. 310/316.01, 316.02, 317, 323.01, 310/323.17, 323.18, 328, 348
See application file for complete search history.

(56) References Cited

U.S. PATENT DOCUMENTS

| 2004/0090146 A1 | 5/2004 | Miyazawa |
| 2012/0228994 A1 | 9/2012 | Wischnewskiy |

FOREIGN PATENT DOCUMENTS

| DE | 102007008252 A1 | 5/2008 | |
| DE | 102008058484 A1 | 9/2009 | |
| DE | 2824824 A1 * | 6/2014 | ............... H02N 2/00 |
| JP | 1928036 A2 * | 6/2008 | ............. G02B 21/26 |
| WO | 2008064974 A1 | 6/2008 | |

OTHER PUBLICATIONS

International Search Report with Written Opinion issued Jun. 28, 2012 for corresponding International Patent Application No. PCT/DE2012/200011 (9 pages).

* cited by examiner

*Primary Examiner* — Thomas Dougherty
(74) *Attorney, Agent, or Firm* — Pierce Atwood LLP; Kevin M. Farrell

(57) ABSTRACT

An ultrasonic motor is described. The ultrasonic motor includes a plurality of plate-shaped piezoelectric ultrasonic actuators. Each of the ultrasonic actuators includes at least one friction element allocated thereto. Each ultrasonic actuator or each of one or more pairs of ultrasonic actuators is assigned an element to be driven. The ultrasonic motor also includes a housing. The ultrasonic motor also includes an electric excitation device. The elements to be driven are movable independently of each other, and each ultrasonic actuator or each of the one or more pairs of ultrasonic actuators is arranged in a holder. The holders are pressed against each other by housing side covers. The friction elements on the ultrasonic actuators are pressed against a friction layer of the corresponding element to be driven by an elastic interlayer that is in contact with edge surfaces of the ultrasonic actuators that are arranged opposite the friction elements.

14 Claims, 16 Drawing Sheets

Figure 1:
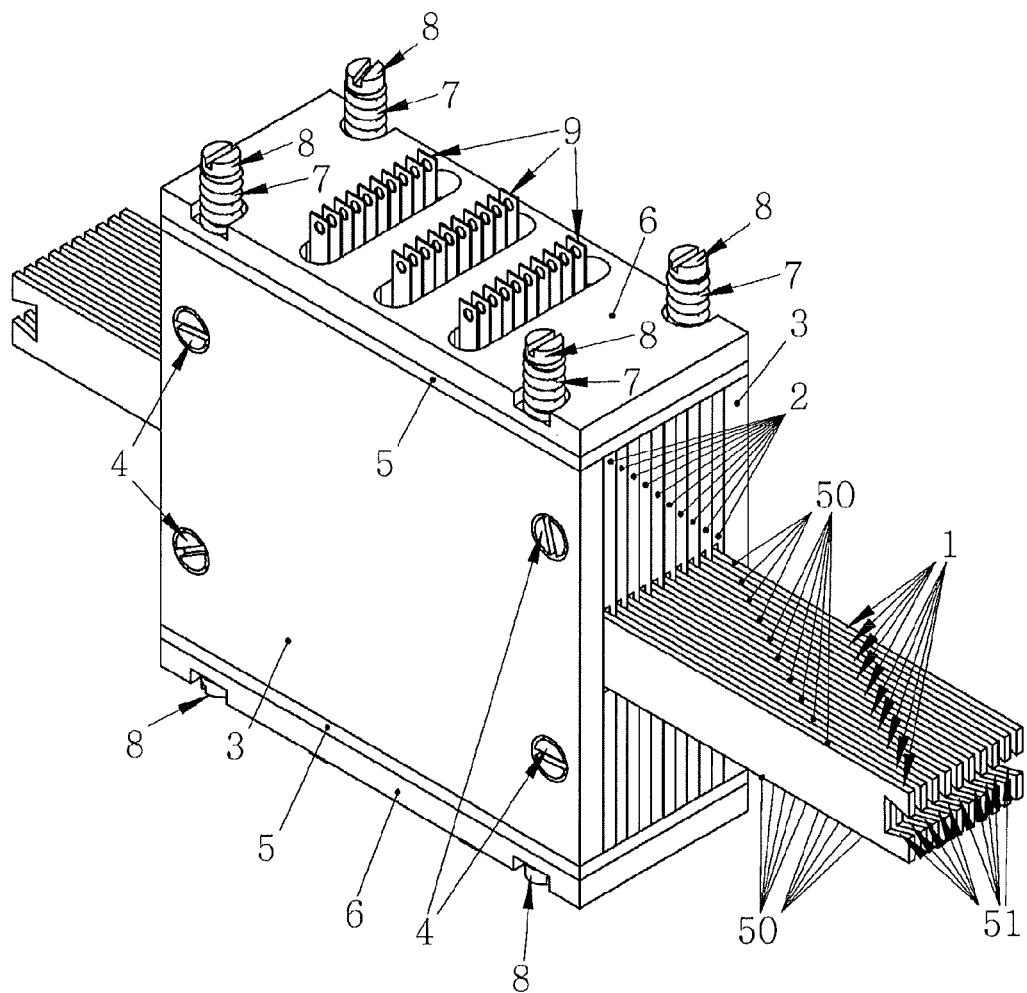

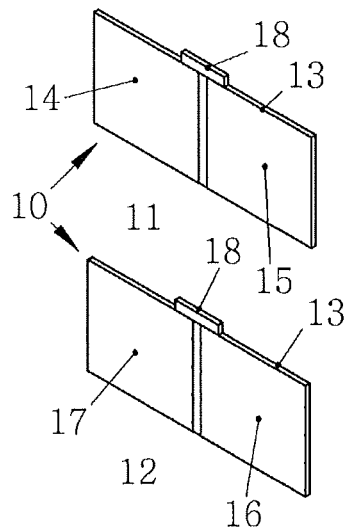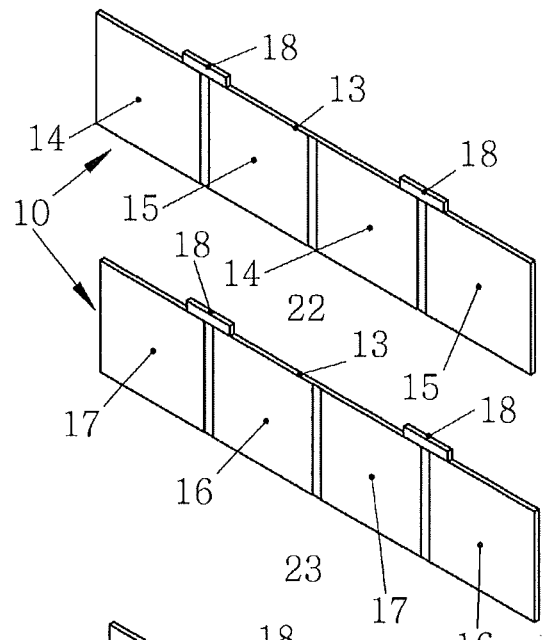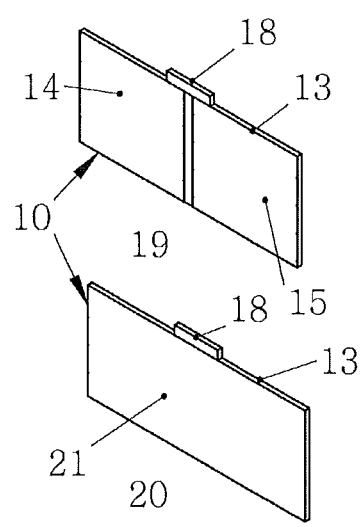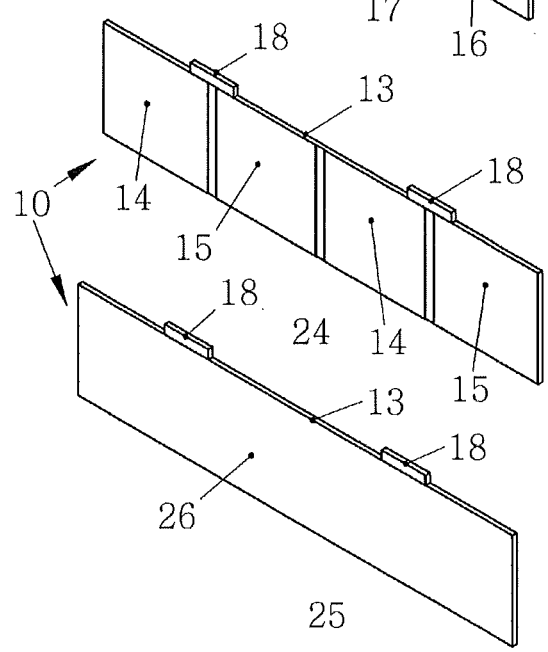
Fig. 3          Fig. 4

ULTRASONIC MOTOR

TECHNICAL FIELD

The present invention relates to an ultrasonic motor comprising a plurality of plate-shaped piezoelectric ultrasonic actuators, each of which has at least one friction element arranged thereon, wherein one element to be driven is allocated to each ultrasonic actuator or ultrasonic actuator pair, and the ultrasonic motor further comprises a housing and an electrical excitation device.

BACKGROUND

Such an ultrasonic motor may particularly be used as a miniature drive unit in various types of precision mechanisms in which parallel, independent forward or rotating motion of multiple movable elements is required. Such elements might be for example the collimator shield plates in x-ray machines, the closing elements of code locks, the modulators for laser or light sources, drive units for multiple lens arrays, the moving parts in chemical and biological metered dispensing apparatuses or in metering devices for spray substances.

Ultrasonic motors equipped with plate-shaped ultrasonic actuators that operate on the basis of acoustic bending and longitudinal waves are known from U.S. Pat. No. 5,714,833. In these motors, the bending wave represents a traction wave and the longitudinal wave represents a type of meshed wave. However, when a bending wave is used as the traction wave, the motor is rather inefficient and the tractive force achievable therewith for a given excitation voltage is relatively small.

In order to increase the tractive force of such motors, multiple ultrasonic actuator are combined in a pack, which is then used to drive an element to be driven. Since all of the actuators are pressed against the element to be driven in parallel, the forces generated by the individual actuators are added together. However, such a motor has correspondingly large dimensions. Furthermore, the high excitation voltage means that a corresponding excitation device is more difficult to produce and the motors are more expensive, which greatly limits their field of use.

Ultrasonic motors with a plate-shaped ultrasonic actuator, which works with two acoustic longitudinal waves are also known from U.S. Pat. No. 6,765,335. The use of a longitudinal wave as the traction wave substantially increases the tractive force of motors with an actuator. Accordingly, there is usually no need to use multiple ultrasonic actuators with such motors. Such motors also work with relatively low excitation voltages.

The disadvantage of such ultrasonic motors, in which the ultrasonic actuator is located in a separate housing, consists in that the motor housing makes it impossible to arrange multiple elements to be driven close together as they must be to function together as a compact unit. Corresponding miniaturisation is therefore only possible to a limited degree.

SUMMARY

The objective of the invention is therefore to provide a compact, highly efficient ultrasonic motor with the smallest possible dimensions with which it is possible to move a plurality of elements to be driven by the application of high tractive forces.

The object defined above is solved by an ultrasonic motor having the features of claim 1. Advantageous variations are described in the subordinate claims.

In the following, the terms 'ultrasonic actuator' and 'actuator', and 'ultrasonic motor' and 'motor' are used interchangeably.

The ultrasonic motor according to the invention comprises a plurality of thin, plate-like piezoelectric ultrasonic actuators, which are arranged at very small distances from each other. The individual ultrasonic actuator are separated from each other by equally thin holders, which fix the ultrasonic actuators in such manner that they are able to move very slightly toward the one or more elements to be driven. In this context, an element to be driven is allocated to each ultrasonic actuator or each pair of ultrasonic actuators, so that independent movement of the elements to be driven is possible. The ultrasonic actuator and the friction element arranged thereon are pressed as a single unit against friction layers of the elements to be driven by an elastic interlayer, while the individual actuators and the holders arranged between them are pressed together by two side covers. Thus overall a highly compact cassette of ultrasonic actuators and therewith an extremely compact ultrasonic motor is produced, with which a plurality of elements to be driven may be moved effectively and independently of each other.

It may be practical for the holder to have sound-damping apertures or grooves.

It may further be practical if the ultrasonic actuators are furnished with electrodes arranged thereon, and connector of the electrodes are in the form of plate-like metal contacts or elements made from conductive plastic or conductive rubber.

It may further be practical if the elastic interlayer comprises rubber or plastic, and preferably consists of these materials.

It may also be practical if the elastic interlayer possesses electrically conductive zones that are in contact with the electrodes of the ultrasonic actuators.

It may be advantageous if the elements to be driven have a plate-like or disc-shaped geometry.

It may also be advantageous if the elements to be driven have structure comprising three or more layers.

In this context, it may be advantageous if at least one layer of an element to be driven comprises oxide ceramic, metal, low-grade ceramic, porous ceramic, porous metal or plastic.

In addition, it may be advantageous if at least one layer of an element to be driven has sound-damping apertures or grooves.

It may prove favourable if the elements to be driven are made partly or entirely from metal with a high atomic number, such as tantalum, tungsten, gold, lead or another, similar material that absorbs x-ray or neutron radiation.

It may also prove favourable if the exciter device contains a number of power amplifiers that matches the number of ultrasonic actuators or the number of ultrasonic actuator pairs, and which excite the ultrasonic actuators, wherein all connectors from these power amplifiers are connected to a pilot frequency generator, of which the output signal frequency is constant and equal to the working frequency of one of the ultrasonic actuators.

It may further prove favourable if the exciter device contains a number of power amplifiers that matches the number of ultrasonic actuators or the number of ultrasonic actuator pairs, and which excite the ultrasonic actuators, wherein all connectors from these power amplifiers are connected to a pilot frequency generator that includes a device for regulating the frequency of the control signal, and which adjusts said frequency to the working frequency of one of the ultrasonic actuators according to the change.

It may be of advantage if the exciter device contains a number of power amplifiers that matches the number of ultrasonic actuators or the number of ultrasonic actuator pairs, and which excite the ultrasonic actuators, wherein the input to each power amplifier is connected to the output of a pilot frequency generator, which contains a device for regulating the frequency of the pilot signal, and which adjusts said frequency depending on the change in the working frequency of the ultrasonic actuator that is excited by the corresponding power amplifier.

It may further be of advantage if each element to be driven is equipped with a transmitter for position and/or for motion speed, which transmitter is connected to a controller for the position or motion speed of said element to be driven.

Further advantages, features and details of the invention are described in the following description of preferred embodiments and with reference to the drawing.

In the drawing:

FIG. 1 shows an ultrasonic motor according to the invention

Figure 2:
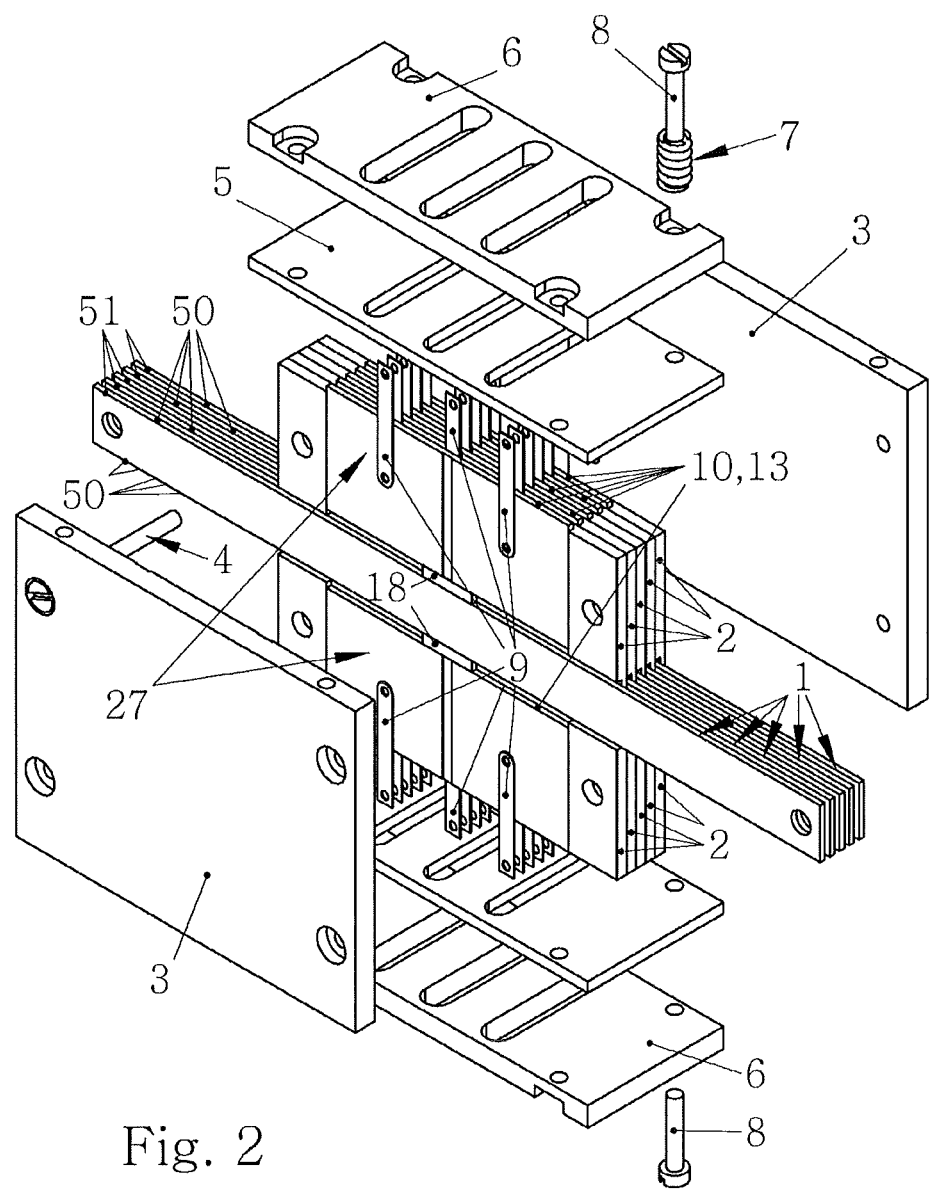
Figure 5:
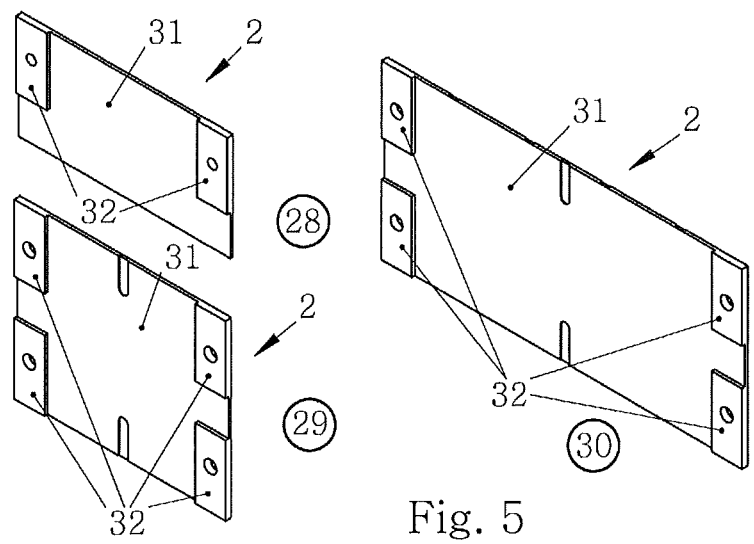
Figure 6:
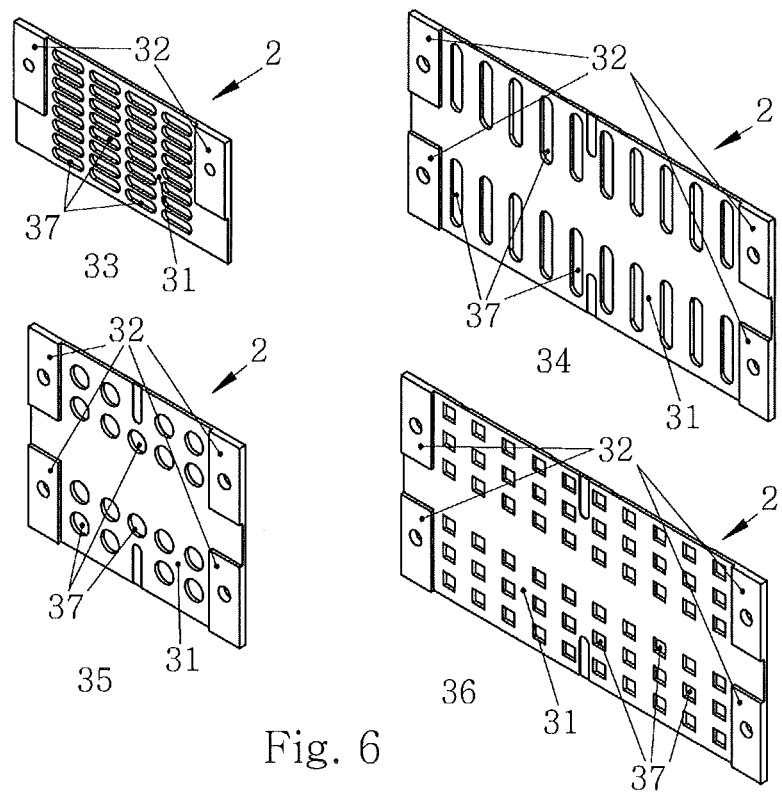
Figure 7:
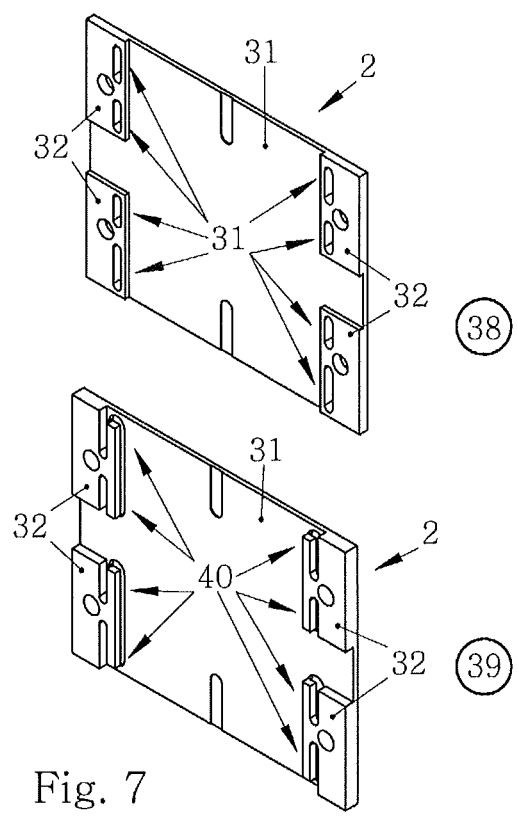
Figure 8:
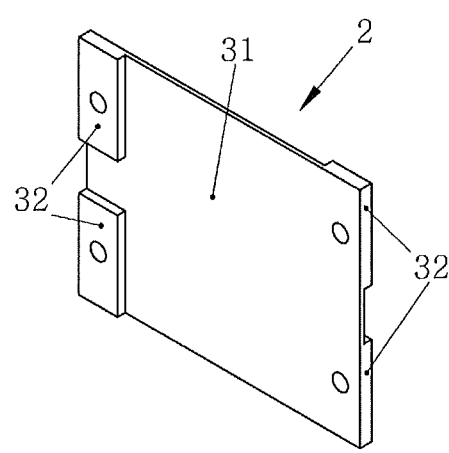
Figure 9:
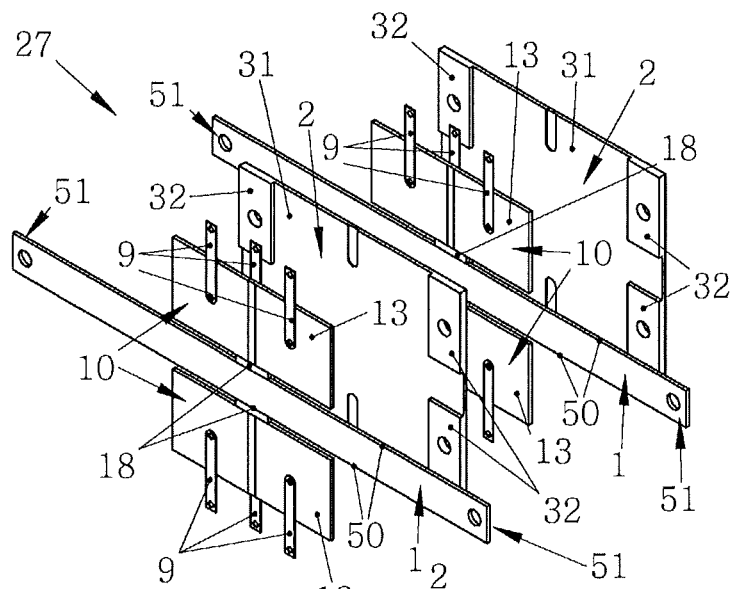
Figure 10:
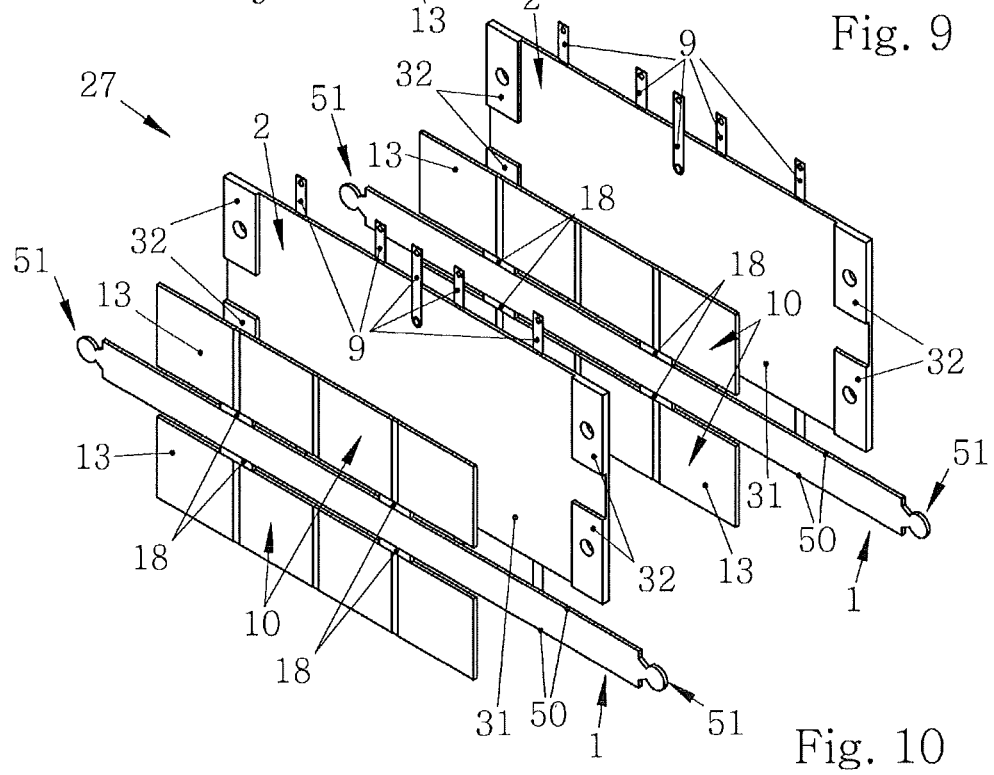
Figure 11:
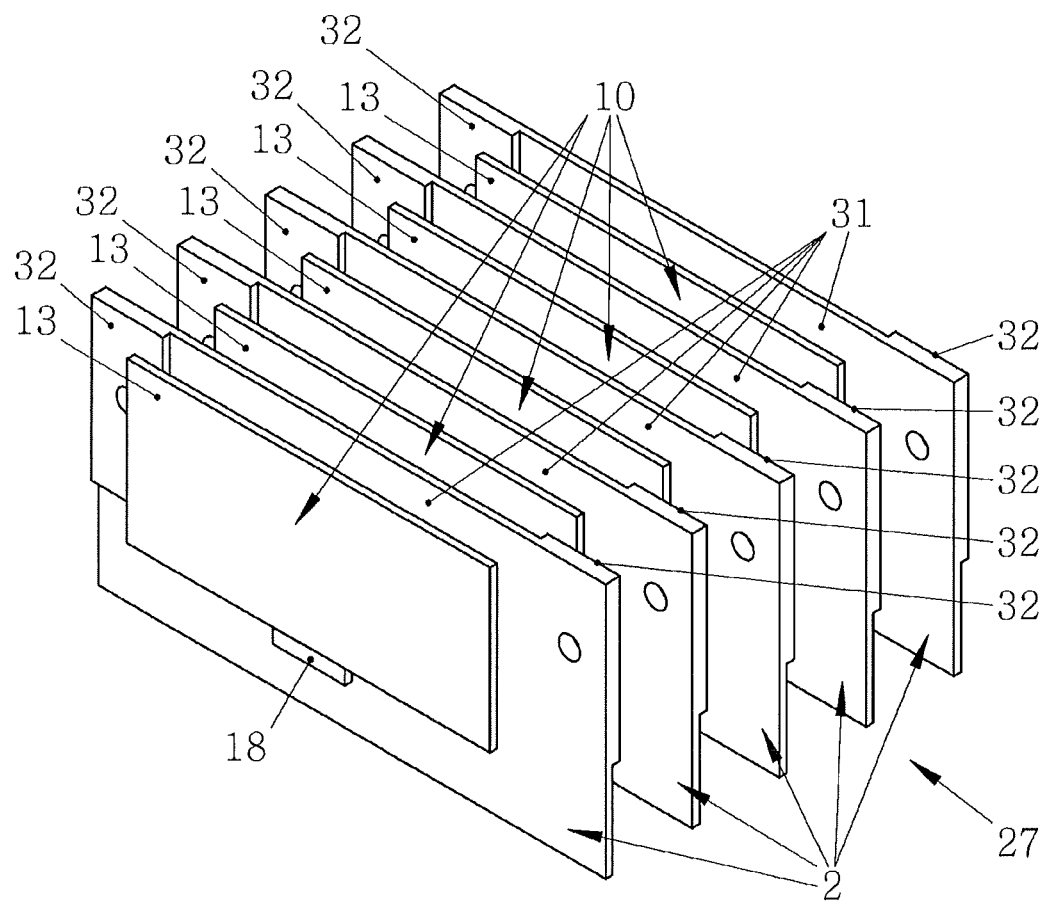
Figure 12:
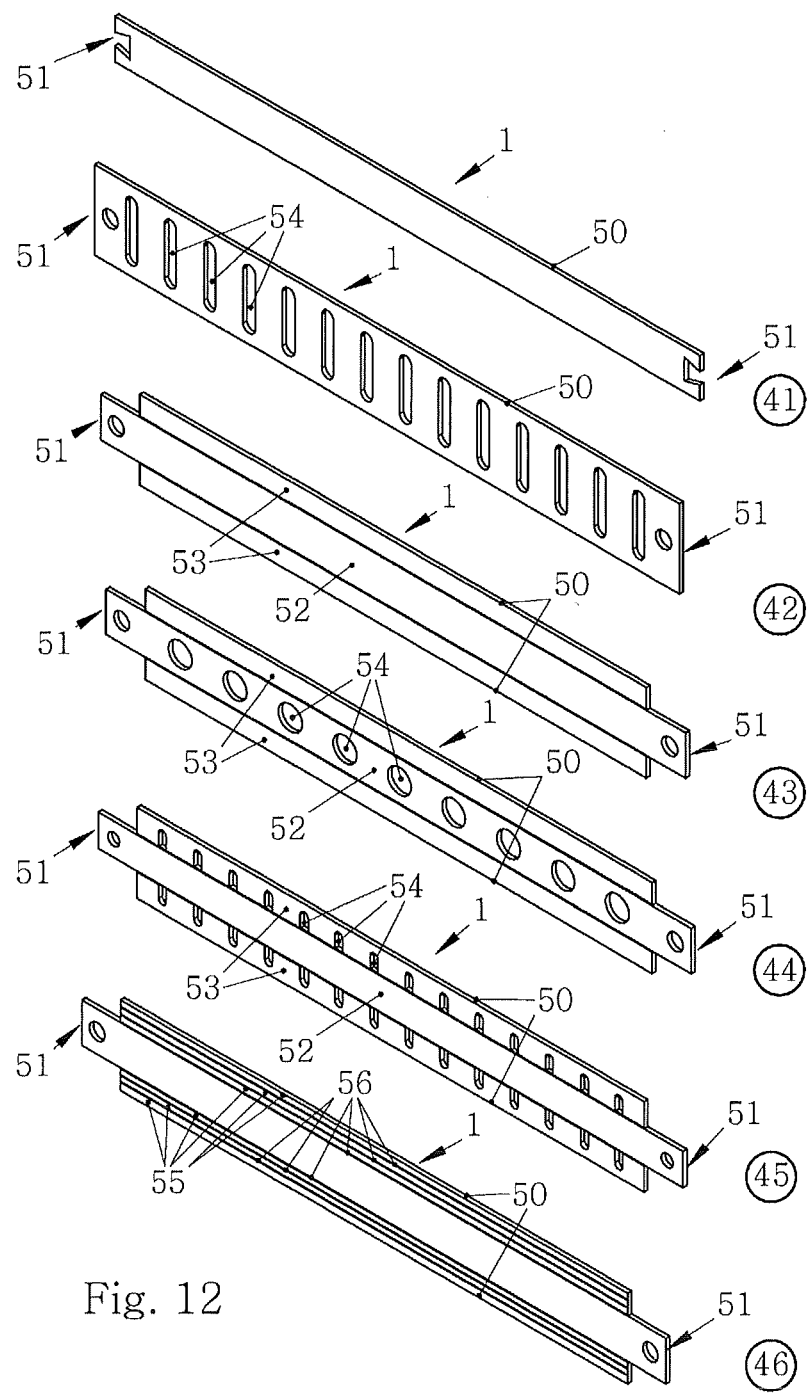
Figure 13:
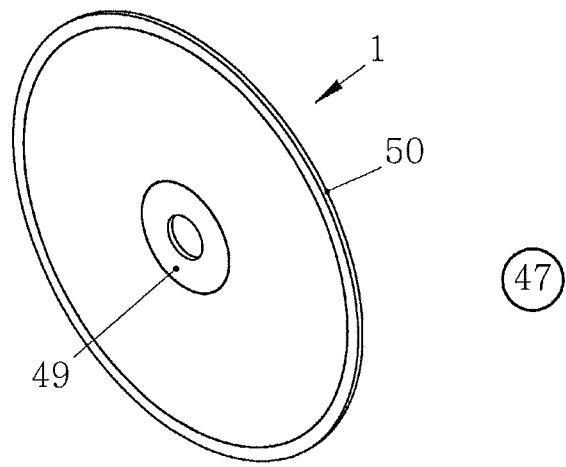
Figure 13:
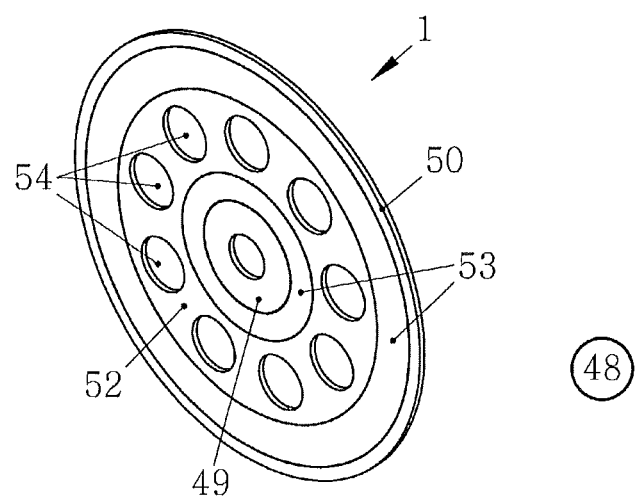
Figure 14:
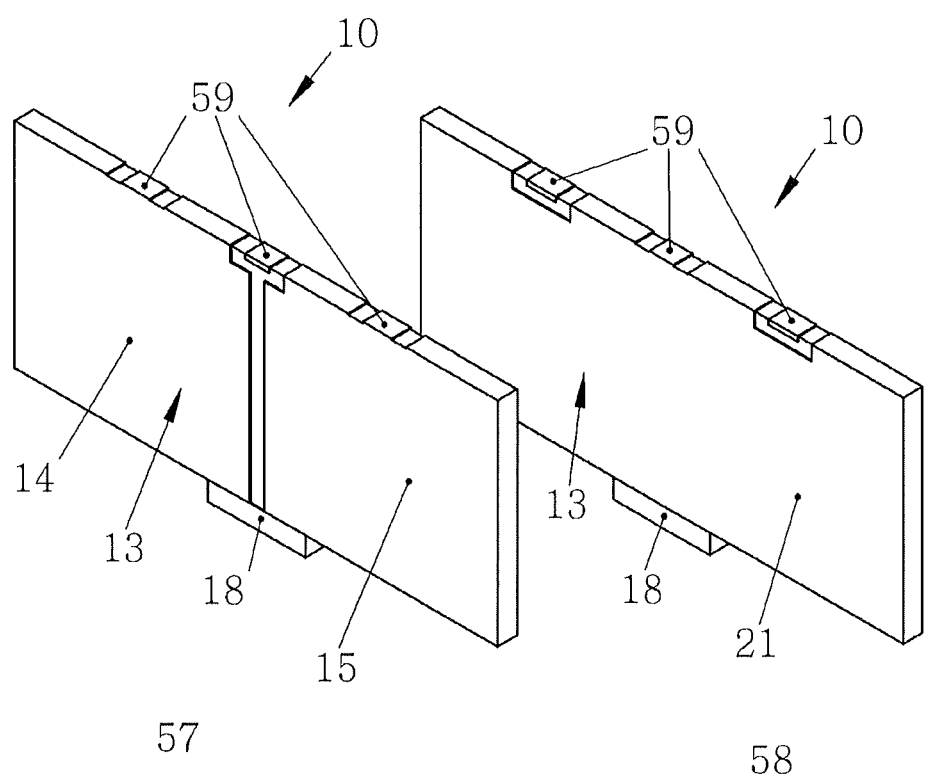
Figure 15:
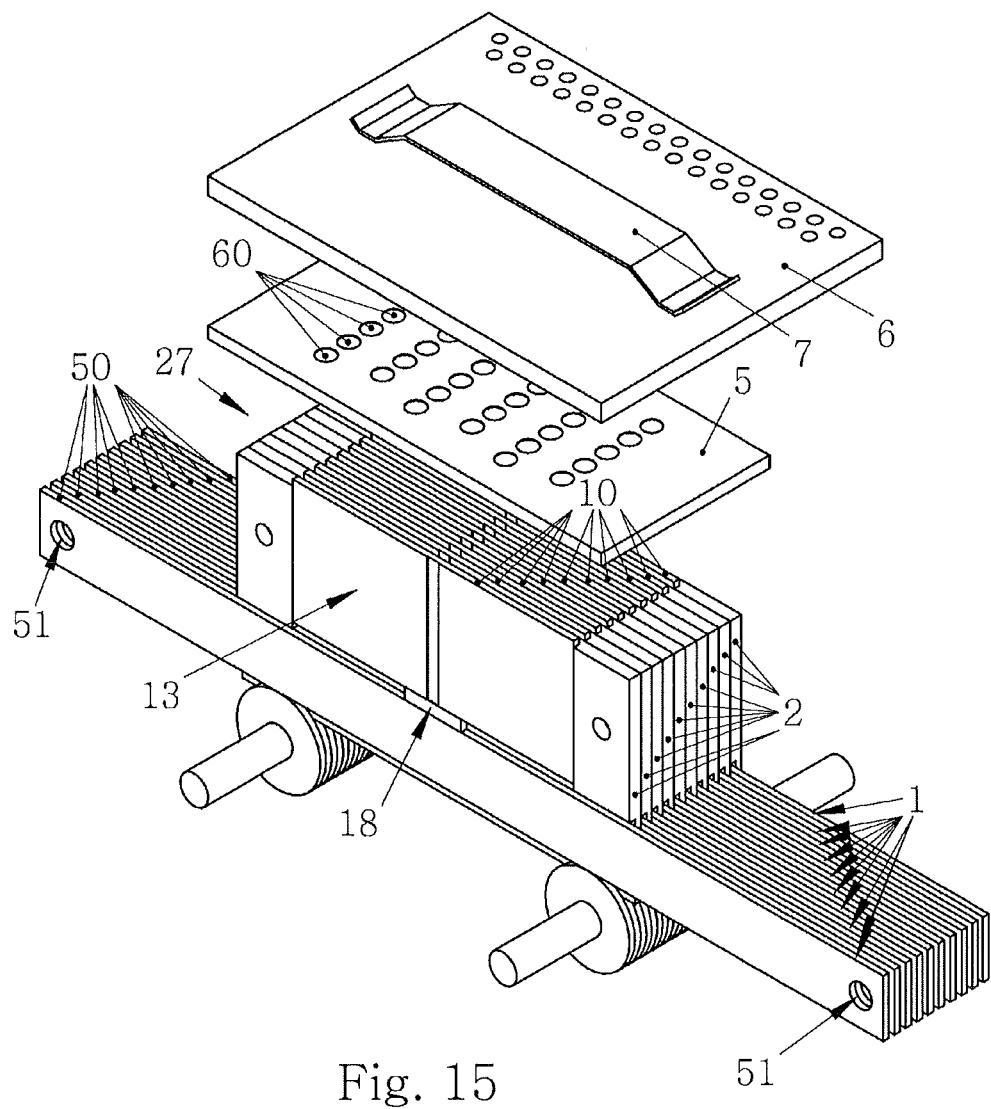
Figure 16:
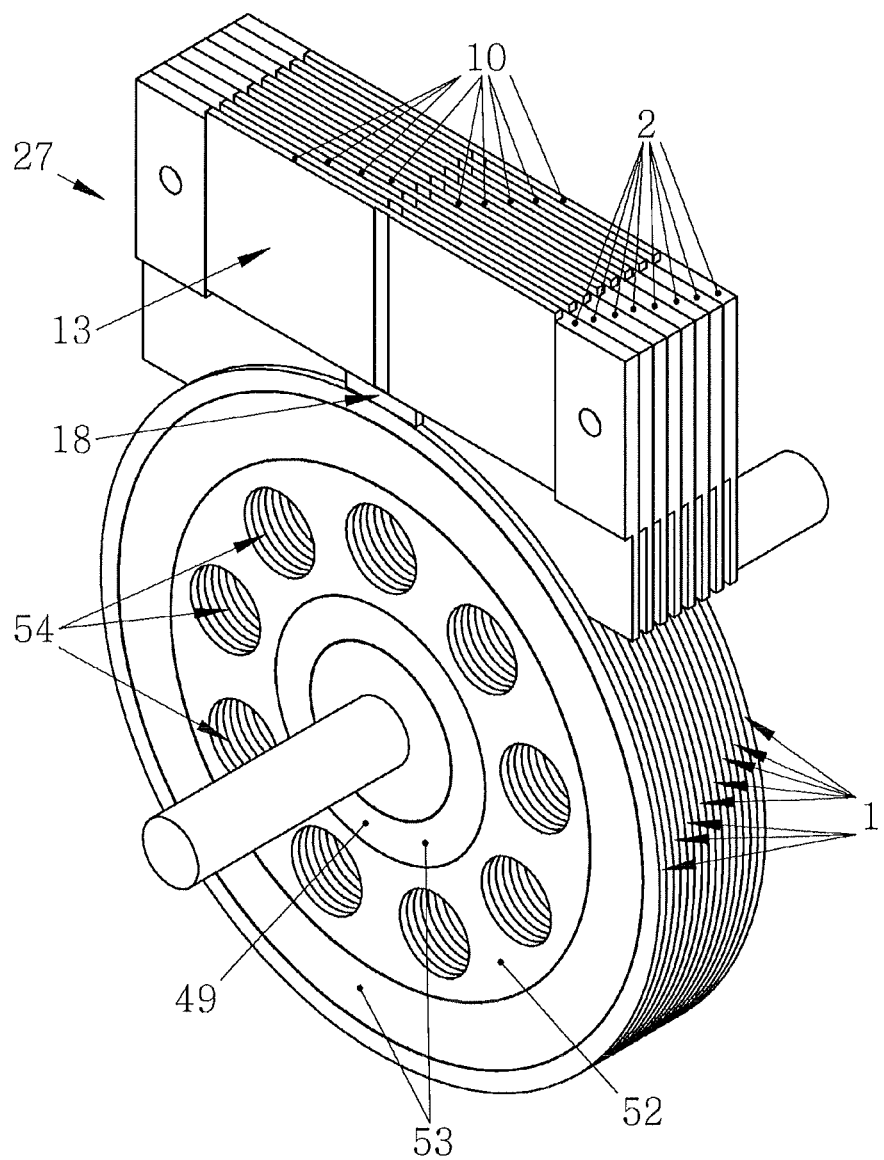

FIG. 2 is an exploded view of an ultrasonic motor of FIG. 1 according to the invention FIGS. 3 and 4 in illustrations 11, 12, 19, 20, 22, 23, 24 and 25 show various embodiments of an ultrasonic actuator of an ultrasonic motor according to the invention FIG. 5 in illustrations 28-30 shows various embodiments of the holder of an ultrasonic motor according to the invention FIG. 6 in illustrations 33-36 shows various embodiments of the holder of an ultrasonic motor according to the invention with damping apertures FIG. 7 in illustrations 38 and 39 shows a holder of an ultrasonic motor according to the invention with various embodiments of the limit stops FIG. 8 shows a holder of an ultrasonic motor according to the invention with limit stops arranged on both sides thereof FIG. 9 shows a construction principle of an ultrasonic motor with ultrasonic actuators according to the invention, each of which comprises a friction element FIG. 10 shows the construction principle of an ultrasonic motor with ultrasonic actuators according to the invention, each of which comprises two friction elements FIG. 11 shows the construction principle of an ultrasonic motor according to the invention with holders that have limit stops on both sides FIG. 12 in illustrations 41-46 shows various embodiments of an elongated element to be driven of an ultrasonic motor according to the invention FIG. 13 in illustrations 47 and 48 shows various embodiments of an annular or disc-shaped element to be driven of an ultrasonic motor according to the invention FIG. 14 in illustrations 57 and 58 shows ultrasonic actuators of an ultrasonic motor according to the invention with contact surfaces FIG. 15 shows the construction principle of an ultrasonic motor according to the invention with an elastic interlayer that comprises electrically conductive zones FIG. 16 shows the construction principle of an ultrasonic motor according to the invention with disc-shaped elements to be driven FIG. 17-20 shows block diagrams for various embodiments of the exciter device of an ultrasonic motor according to the invention

DETAILED DESCRIPTION

FIG. 1 shows an ultrasonic motor according to the invention in the assembled and built state. In all, ten holders 2 each hold an actuator pair arranged opposite thereto (not shown in FIG. 1). The actuators of each actuator pair are pressed against the respectively allocated element to be driven 1 by elastic interlayers 5, wherein housing end covers 6 in their turn press against elastic interlayers 5. These are secured to housing side covers 3 by means of compression springs 7 and compression bolts 8.

Elastic interlayers 5 are made from a rubbery material with a very low modulus of elasticity, thus ensuring that the elastic interlayers only cause a slight damping of the actuator vibration. In addition, it is conceivable to use elastic interlayers made from a very soft plastic.

Connectors 9 project through apertures in housing end cover 6 and are connected to the electrodes of the actuators so that electric exciter voltage can be applied thereto. Holders 2 are pressed together at the sides by housing side covers 3, which are connected to each other via tension bolts 4, and press holders 2 together therebetween, so that a stack 27 of actuators is created.

Piezoelectric plates 13 of each actuator 10 have the following dimensions: length L=50 mm, height H=23 mm and thickness t=1.0 mm. Plates 13 are made from PIC brand piezoceramic 181 manufactured by PI Ceramic GmbH, D-07589 Lederhose. Friction elements 18, which are not shown in FIG. 1, are constructed as rectangular plates and are made from oxide ceramic of the Sialon type. Elements to be driven 1 are constructed as plates having a length of 100 mm, a height of 10 mm and a thickness of 1.0 mm.

With an amplitude of sinusoidal excitation voltage of 20 V and a working frequency of $f_a$=82.5 kHz, element to be driven 1 of the motor develops a maximum tractive force of 20 N.

In the design shown in FIG. 1, in which the motor comprises ten elements to be driven 1, the distance between the two outermost elements to be driven is 20 mm.

FIG. 2 is an exploded view of the ultrasonic motor according to the invention shown in FIG. 1. Actuators 10 with the friction element 18 arranged on each of them are clamped in holders 2 in such manner that they are slightly movable towards the respective element to be driven 1. Friction elements 18 are in contact with friction layers 50 of elements to be driven 1.

In illustrations 11 and 12, FIG. 3 shows a front and rear view of an ultrasonic actuator of an ultrasonic motor according to the invention. According to illustration 11, this is constructed as a thin, rectangular piezoelectric plate 13, wherein excitation electrodes 14 and 15 are arranged on one side and the two general electrodes 16 and 17 are arranged on the opposite side. The ultrasonic actuator also comprises a friction element 18, which is arranged on one of the long edge surfaces thereof.

Illustrations 19 and 20 of FIG. 3 show front and rear views of another embodiment of an ultrasonic actuator of an ultrasonic motor according to the invention. In this case, ultrasonic actuator 10 is in the form of a thin, rectangular piezoelectric plate 13 and has both excitation electrodes 14 and 15 on the front and a general electrode 21 on the rear thereof. In turn, the ultrasonic actuator according to illustrations 19 and 20 has a friction element 18 which is arranged on the long edge surfaces thereof.

Illustrations 22 and 23 in FIG. 4 show front and rear views of a further embodiment of an ultrasonic actuator of an ultrasonic motor according to the invention. In this case, ultrasonic actuator 10 is in the form of a thin, rectangular piezoelectric plate 13 and has two pairs of excitation electrodes 14, 15 on the front thereof and two pairs of general electrodes 16, 17 on the rear thereof. Two friction elements 18 are arranged at a distance from one another on one of the long side surfaces of ultrasonic actuator 10.

According to illustrations 24 and 25 in FIG. 4, unlike the ultrasonic actuator of illustrations 22 and 23 it is possible to replace both pairs of general electrodes on the rear with a single general electrode 26.

Ultrasonic actuators 10 according to illustrations 11, 12, 19, 20 and 22 to 25 are polarized vertically with respect to the excitation electrodes and the general electrode or the single general electrode. This also includes the cases in which differing, that is to way antiparallel polarization directions exist in different areas of the ultrasonic actuator.

The actuators 10 shown in FIG. 3 function according to the principle that a first ($\lambda/2$) mode of an acoustic longitudinal standing wave is excited therein relative to height H of the actuator and a second ($\lambda$) mode of an acoustic longitudinal standing wave is excited therein relative to length L of the actuator with the aid of the electrical voltage having frequency $f_a$.

In comparison thereto, the actuators 10 shown in FIG. 4 function in such manner that a first ($\lambda/2$) mode of an acoustic longitudinal standing wave is excited therein relative to height H of the actuator, and the fourth ($2\lambda$) mode of an acoustic longitudinal standing wave is excited therein relative to length L of the actuator with the aid of the electrical voltage having frequency $f_a$.

In this context, length L and height H represent resonance dimensions of the acoustic waves excited in actuator 10, while thickness t of actuator 10 does not represent a resonance value for the excited acoustic waves and is selected to be less than H/10.

Friction elements 18 may have the form of a rectangular prism or they may be pyramidal, and they may also comprise cylindrical or polycylindrical elements and hemispheres or similar geometrical elements or sections. They are made from hard oxide ceramics with an $Al_2O_3$, $ZrO_2$, SiC, $Si_3N_4$ base or from metal ceramic with a WC, $Al_2TiO_5$ base, or from another, similar abrasion-resistant material.

Illustrations 28 to 50 in FIG. 5 show various embodiments of holder 2 of an ultrasonic motor according to the invention. Illustration 28 in FIG. 5 shows a holder 2 for fixing an actuator 10 that comprises a friction element, while illustration 29 in FIG. 5 shows a holder 2 that serves to fix two actuators located opposite one another with one friction element for each. Illustration 30 in FIG. 5 shows a holder for two actuators arranged opposite one another with two friction elements each. Each of the holders 2 shown in illustrations 28 to 30 has a thin side wall 31 and also comprises limit stops 32, wherein side wall 31 prevents the actuator is it holding from being displaced transversely, and limit stops 32 prevent the respective actuator from being displaced longitudinally. The side wall has the further task of minimising mutual interference between the ultrasonic vibration generated respectively by adjacent ultrasonic actuators, and to isolate them from one another in this regard.

Illustrations 33 to 36 of FIG. 6 show further embodiments of holder 2, in which the holder is furnished with noise-damping apertures 37 in side wall 31. In the following, the terms 'noise-damping apertures' and 'damping apertures' will be used interchangeably. Said apertures serve damp parasitic acoustic waves that are propagated in holder 2. In the holder according to illustration 33, these apertures have the form of elongated slots that extend in the longitudinal direction of the holder. The damping apertures of holder 2 according to illustration 34 of FIG. 6 are also in the form of elongated slots, but in this case they extend transversely to the longitudinal direction of the holder. According to illustration 35 of FIG. 6, damping apertures 37 of holder 2 are circular, and in illustration 36 of FIG. 6 the damping apertures are square in shape.

Illustrations 38 and 39 of FIG. 7 show further embodiments of limit stops 32 of holder 2. In this case, limit stops 32 are designed to have a specific elasticity, and they pick up the vibration of the ultrasonic actuators held thereby, and vibration and resonance vibration is also induced therein, so that the mechanical losses in holders 2 may be reduced.

According to FIG. 8, it is also possible to arrange limit stops 32 on both sides of side wall 31, so that gaps when a corresponding ultrasonic motor is in the assembled state gap between the actuators and the limit stops may be prevented.

Holders 2 according to FIGS. 6 to 8 consist of a high-temperature resistant plastic. Alternatively, however, they may also have a metal base body, which is coated with a thin layer of a high-temperature resistant plastic.

FIG. 9 illustrates the construction principle of an embodiment of the ultrasonic motor according to the invention, wherein two ultrasonic actuators 10 positioned opposite one another move an element to be driven 1 that is allocated thereto, and each ultrasonic actuator comprises a friction element 18.

FIG. 10 illustrates the construction principle of a further embodiment of the ultrasonic motor according to the invention. The essential difference between this and FIG. 9 consists in that the ultrasonic actuators each comprise two friction elements 18.

FIG. 11 illustrates the construction principle of an embodiment of the ultrasonic motor according to the invention in which holder 2 comprising limit stops 32 on both sides of side surface 31 are used. This enables a particularly compact construction of the ultrasonic motor.

Illustrations 41 to 46 in FIG. 12 show various embodiments of element to be driven 1. According to illustration 41, the element to be driven is constructed as a monolith and has an elongated, rectangular shape. Friction layers 50 are arranged on the long side surfaces thereof. Joining sections 51 for connection the elements to be driven with a mechanical load are located on the ends of the element to be driven.

Element to be driven 1 in illustration 42 of FIG. 12 is of monolithic construction and has an elongated, rectangular shape with friction surfaces on the long side surfaces. The element to be driven is also furnished with damping apertures 54, shaped like elongated slots aligned perpendicularly to the longitudinal extension of the element to be driven.

According to illustration 43 of FIG. 12, element to be driven 1 is constructed in multiple sections and has a base 52 and two side members 53. It is also conceivable to use only one side member. Base 52 is made of steel, but other metals are also possible. On the other hand, the side members are made of metal ceramic and have a friction layer 50 on the long side surfaces thereof.

Element to be driven 1 in illustration 44 of FIG. 12 differs from that of illustration 43 in FIG. 12 only in that base 52 comprises damping apertures 54.

In element to be driven 1 according to illustration 45 of FIG. 12, the two side members 53 comprise damping apertures 54, whereas in the element to be driven according to illustration 46 of FIG. 12 both side members have a multilayer structure of hard layers 55 and soft layers 56, wherein layers 55 are made from metal ceramic and layers 56 are made from a rubbery material.

In all variants of elements to be driven 1, the friction layers 50 thereof are produced from a hard, abrasion-resistant material. A thin layer of hard chrome is used for this. Alternatives thereto are for example a layer of $Al_2O_3$, a layer containing small diamond crystals precipitated from the gas phase, or a layer of thin coatings consisting of CrN, CrCN, (Cr, W)N, (Cr,Al)N, NbN—CrN, TiN, TiCN, (Ti,Al)N, $V_2O_5$. Plates of hard oxide ceramic on a basis of $Al_2O_3$, $ZrO_2$, SiC, $Si_3N_4$ or metal ceramic on a basis of WC, $Al_2TiO_5$ or similar abrasion-resistant materials may be used as friction plates 50.

Element to be driven 1 may be produced in part or entirely from a metal with a high atomic number, for example titanium, tungsten, gold, lead or another, similar material that absorbs x-ray or neutron radiation. In this way, it can be used to protect the motors from the effects of such radiation.

Illustrations 47 and 48 of FIG. 13 show disc-shaped elements to be driven 1 with a ball bearing race 49 arranged in the centre and having a friction layer 50 on the outer circumference. Whereas the element to be driven is constructed as a monolith, as shown in illustration 47, the element to be driven according to illustration 48 comprises a base 52 and two side members 53, wherein two damping apertures 54 are provided in base 52.

Illustrations 57 and 58 of FIG. 14 show a front and rear view respectively of an ultrasonic actuator 10 of an ultrasonic motor according to the invention. As shown in illustration 57, excitation electrodes 14 and 15 are located on the front side, and are contacted electrically via corresponding contact surfaces 59. According to illustration 58, general electrode 21 is located on the rear of the actuator and is electrically contacted via corresponding contact surface 59.

FIG. 15 shows an ultrasonic motor arrangement in which the individual actuators comprise contact surfaces as in FIG. 14. Elastic interlayer 5 comprises electrically conductive zones 60 that touch the contact surfaces of the actuators when the ultrasonic motor is in the assembled state. The underside of end cover 6 comprises current pathways (not shown in FIG. 15), which contact electrically conductive zones 60 in the assembled state, so that actuators 10 can be electrically excited by the elastic interlayer via the end cover.

FIG. 16 illustrates the construction of an ultrasonic motor according to the invention with disc-shaped elements to be driven 1.

Figure 17:
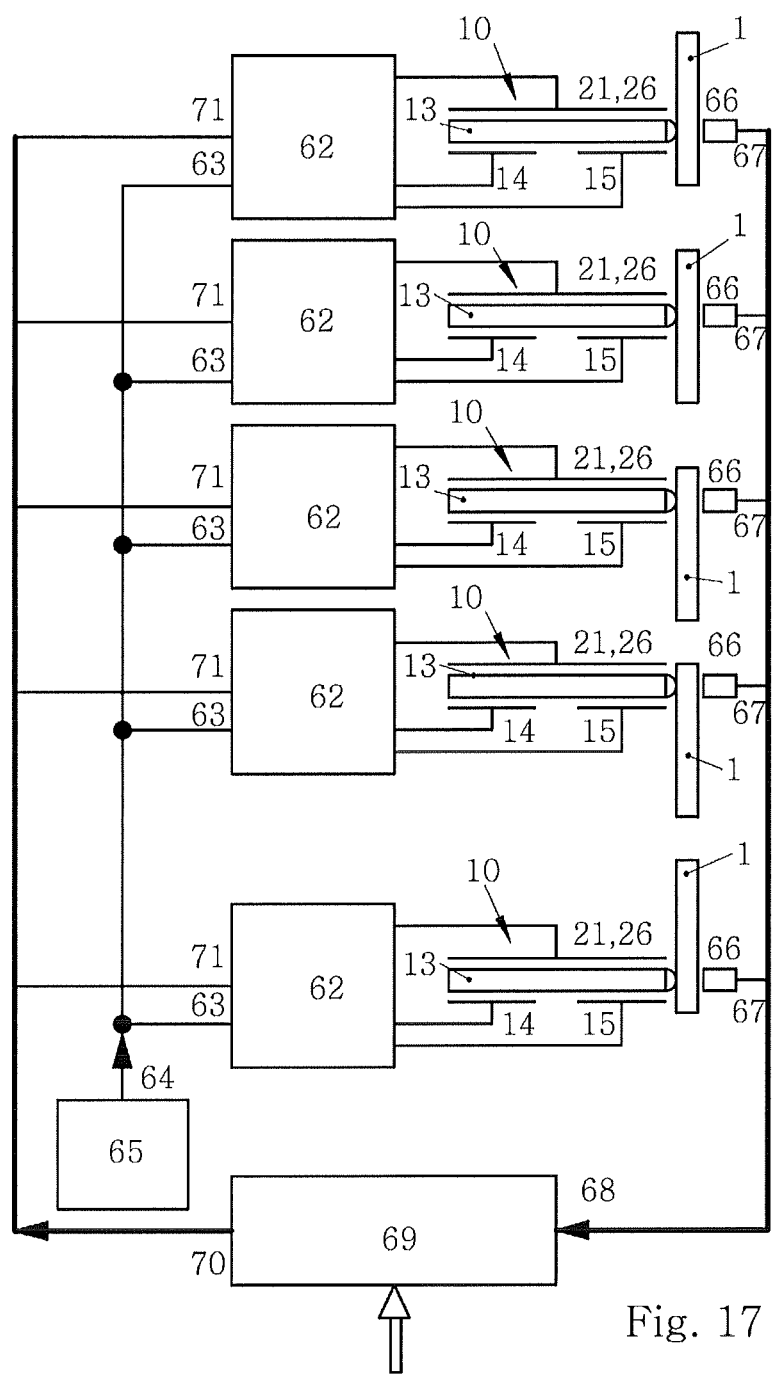

FIG. 17 shows the block circuit diagram of the excitation device of an ultrasonic motor according to the invention. The excitation device comprises a power amplifier 62 with inputs 63, wherein the number of power amplifiers 62 is equal to the number of actuators or actuator pairs used in the ultrasonic motor. The signal from output 64 of a pilot frequency generator 65 is applied to inputs 63 of power amplifiers 62. The frequency of the output signal of pilot frequency generator 65 is kept constant and equal to working frequency $f_a$ of one of the actuators 10 when the ultrasonic motor is running.

A position or speed transmitter 66 is assigned to each element to be driven 1. The signals from the outputs of each transmitter 66 are fed to inputs 68 of a multifunctional controller 69, the outputs 70 of which are connected to control inputs 71 of power amplifiers 62. Controller 69 controls the position or movement speed of the corresponding element to be driven 1.

Figure 18:
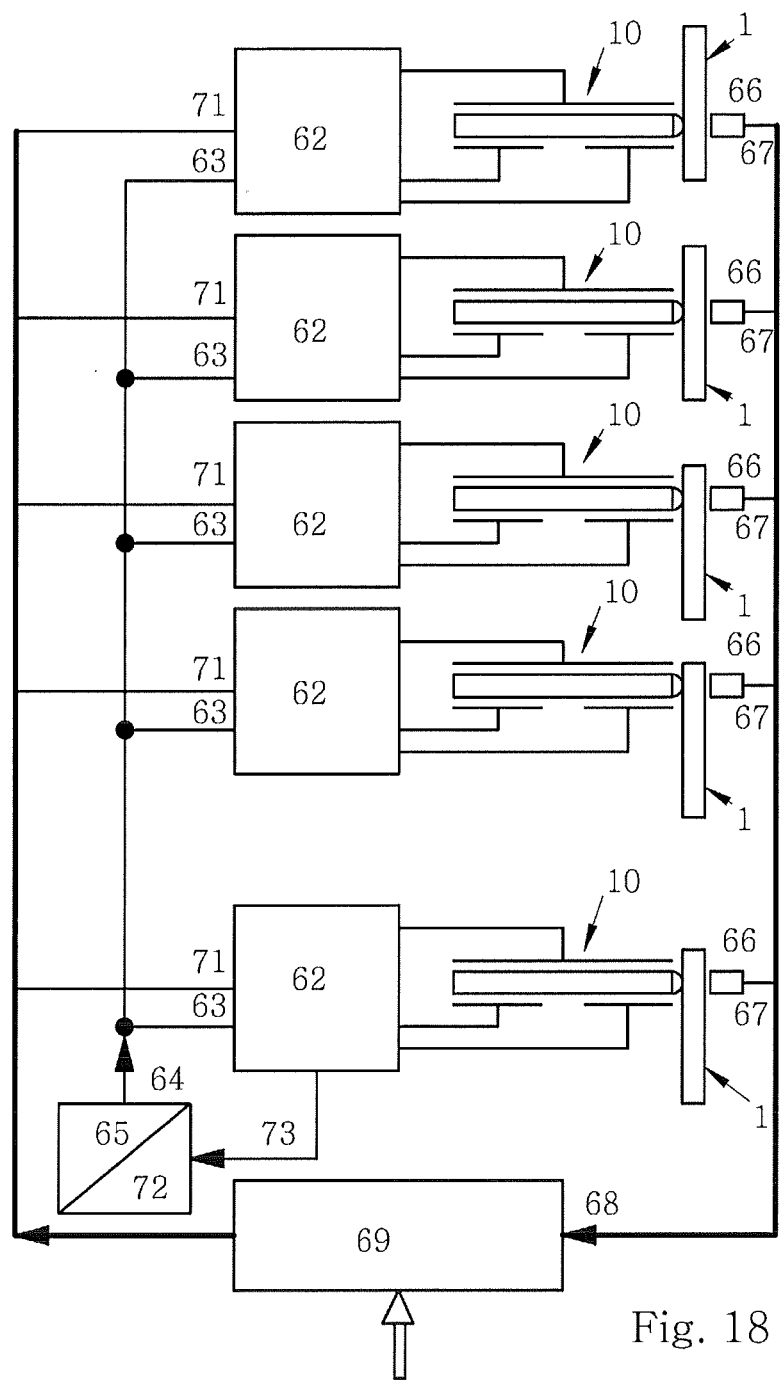

FIG. 18 shows the block circuit diagram of a further embodiment of the excitation device of an ultrasonic motor according to the invention, in which pilot frequency generator 65 is equipped with a device 72 for adjusting the frequency of the generated signal. This frequency adjustment device works with a control signal that is fed to frequency adjustment device 72 via a transmission channel 73. The control signal contains the information about the value of the working frequency $f_a$ of one of the ultrasonic actuators 10. Such a signal may represent the electrical voltage that is proportional to the phase of the current flowing through actuator 10 or to the phase of the voltage at the free electrode.

Figure 19:
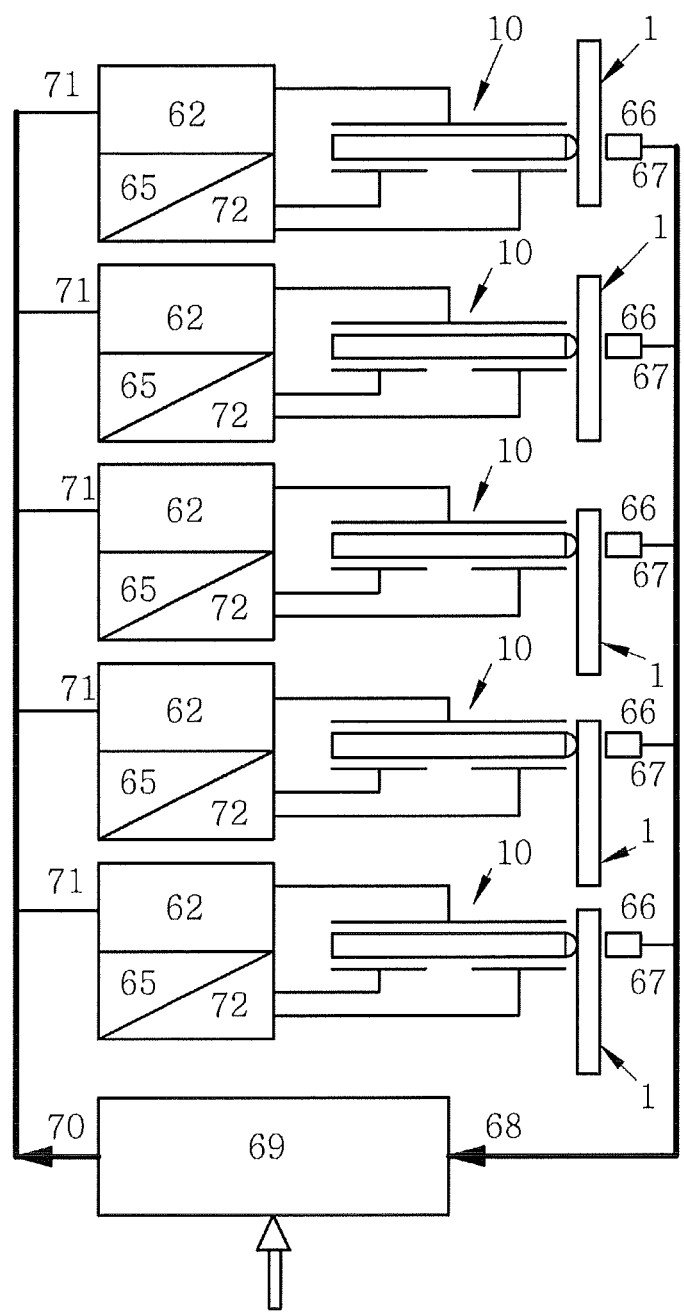

FIG. 19 shows the block circuit diagram of a further embodiment of the excitation device of an ultrasonic motor according to the invention, in which each power amplifier 62 is connected to the corresponding pilot frequency generator 65 with frequency adjustment device 72. In this case, the frequency of each pilot frequency generator 65 is adjusted such that it is identical to the working frequency of the corresponding ultrasonic actuator 10.

Figure 20:
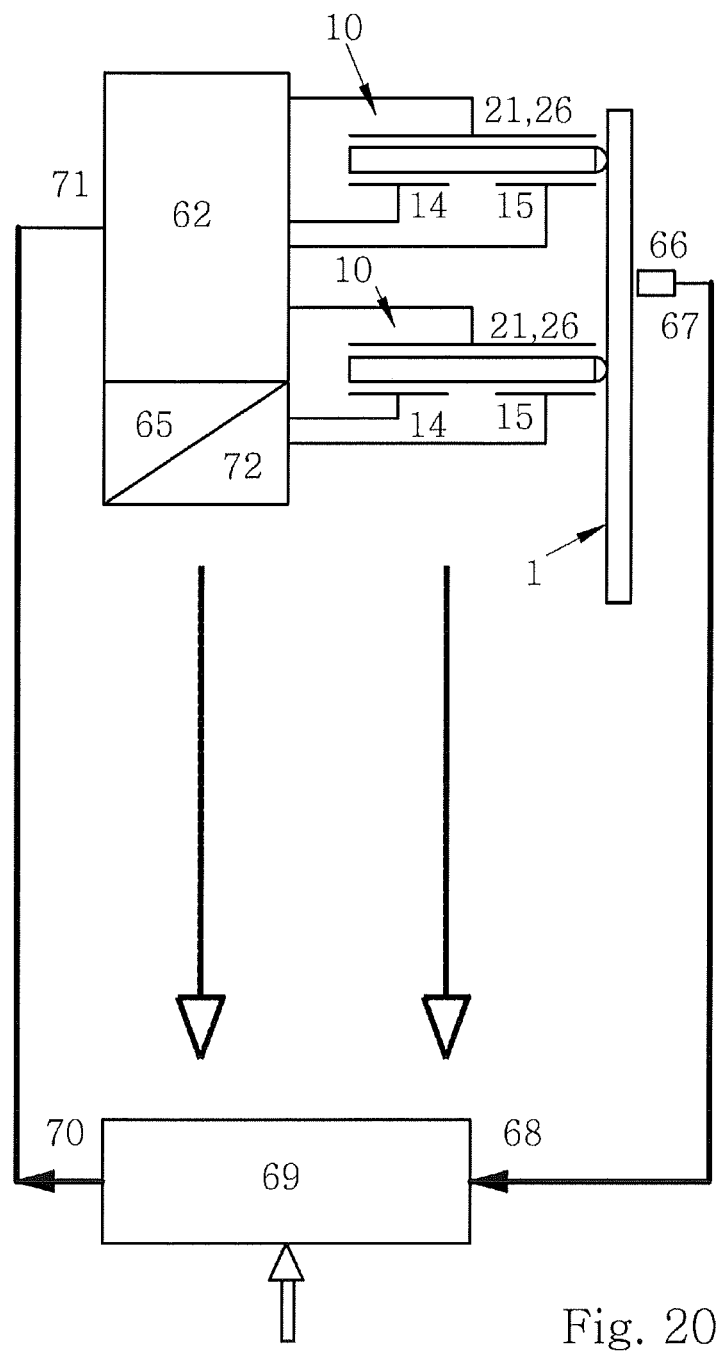

FIG. 20 shows the block circuit diagram of an excitation device for an ultrasonic motor according to the invention comprising multiple actuator pairs 10. In this case, a power amplifier 62 excites an actuator pair 10, the frequency of each pilot frequency generator 65 being tuned to the working frequency $f_a$ of one of the ultrasonic actuators 10 of the corresponding actuator pairs 10.

The ultrasonic actuators of the motor according this proposal can be excited both by a single phase and a two phase electrical voltage. In single-phase excitation of actuator 10, an electrical voltage from the excitation device with a frequency that is equal to working frequency fa is applied to the excitation electrode 14 and the general electrode 21, 26 or to the excitation electrode 15 and the general electrode 21, 26. The consequence of this is that two acoustic longitudinal standing waves are generated simultaneously in each actuator, and these are propagated in the direct of length L and height H of the actuator. Under the effect of these waves, the friction element of each actuator moves along an inclined path of motion.

With two-phase excitement of the actuator, two phase-offset voltages with the same frequency $f_a$ are applied to each electrode pair simultaneously. The result of this is that the friction element of each actuator moves along an elliptical path of motion.

Actuator 10 is able to move the element to be driven in opposite directions in both single-phase and two-phase modes. With single-phase excitation, the direction of movement of the element to be driven is effected by a change with regard to electrically controlled excitation electrode. With two-phase excitation the change in direction of movement is brought about by shifting the phase offset angle between the two excitation voltages through 180°.

The ultrasonic motor according to the invention is a packet motor with multiple drives, in which the elements to be driven are moved in parallel and independently of each other. This motor is significantly more compact that ultrasonic motors according to the known prior art. In this device, the adjacent elements are arranged with such a small distance between them that it is smaller than thickness t of plate-like actuators 10, which in turn means that the distance between the two outermost elements to be driven is also minimal.

Compared with the known prior art, the ultrasonic motor according to the invention develops more tractive force, it has a smaller excitation voltage, is more efficient, and is of simpler design and construction, thereby lowering manufacturing costs.

The invention claimed is:
1. An ultrasonic motor, comprising:
   a plurality of plate-shaped piezoelectric ultrasonic actuators, each having at least one friction element allocated thereto, wherein an element to be driven is assigned to each ultrasonic actuator or each of one or more pairs of ultrasonic actuators;
   a housing; and
   an electric excitation device, wherein the elements to be driven are movable independently of each other, and each ultrasonic actuator or each of the one or more pairs of ultrasonic actuators is arranged in a holder, wherein the holders are pressed against each other by means of housing side covers, and the friction elements on the ultrasonic actuators are pressed against a friction layer of the corresponding element to be driven by means of an elastic interlayer that is in contact with edge surfaces of the ultrasonic actuators that are arranged opposite the friction elements.

2. The ultrasonic motor of claim 1, wherein the holder further comprises sound damping apertures or grooves.

3. The ultrasonic motor of claim 1, further comprising electrodes allocated to the ultrasonic actuators, the electrodes including electrical connectors, wherein the electrical connectors include at least one of plate-like metal contacts, conductive plastic elements, or conductive rubber elements.

4. The ultrasonic motor of claim 1, wherein the elastic interlayer includes at least one of rubber or plastic.

5. The ultrasonic motor of claim 1, wherein the elastic interlayer includes electrically conductive zones, the electrically conductive zones being in contact with the electrodes of the ultrasonic actuators.

6. The ultrasonic motor of claim 1, wherein a geometry of the elements to be driven is one or more of plate-like or disc-shaped.

7. The ultrasonic motor of claim 1, wherein the elements to be driven have a structure consisting of three or more layers.

8. The ultrasonic motor of claim 7, wherein at least one layer of at least one of the elements to be driven includes one or more of oxide ceramic, metal, low quality ceramic, porous ceramic, porous metal, or plastic.

9. The ultrasonic motor of claim 7, wherein at least one layer of at least one of the elements to be driven includes sound-damping apertures or grooves.

10. The ultrasonic motor of claim 1, wherein the elements to be driven include one or more of tantalum, tungsten, gold, lead, a material that absorbs x-ray radiation, or a material that absorbs neutron radiation.

11. The ultrasonic motor of claim 1, wherein the excitation device includes one or more power amplifiers, the number of the one or more power amplifiers being equal to the number of ultrasonic actuators or being equal to the number of the one or more pairs of ultrasonic actuators, the one or more power amplifiers configured to excite the ultrasonic actuators, wherein the one or more power amplifiers are connected to a pilot frequency generator, the output frequency of the pilot frequency generator being constant and identical to the working frequency of at least one of the ultrasonic actuators.

12. The ultrasonic motor of claim 1, wherein the excitation device includes one or more power amplifiers, the number of the one or more power amplifiers being equal to the number of ultrasonic actuators or being equal to the number of the one or more pairs of ultrasonic actuators, the one or more power amplifiers configured to excite the ultrasonic actuators, wherein the one or more power amplifiers are connected to a pilot frequency generator, the pilot frequency generator including a device for regulating a frequency of a control signal, the device configured to adjust the frequency of the control signal to a working frequency of at least one of the ultrasonic actuators.

13. The ultrasonic motor of claim 1, wherein the excitation device includes one or more power amplifiers, the number of the one or more power amplifiers being equal to the number of ultrasonic actuators or being equal to the number of the one or more pairs of ultrasonic actuators, the one or more power amplifiers configured to excite the ultrasonic actuators, wherein an input to each power amplifier is connected to an output from a pilot frequency generator, the pilot frequency generator including a device for regulating a frequency of a control signal, the device configured to adjust the frequency of the control signal to a change to a working frequency of an ultrasonic actuator that is being excited by a power amplifier connected to the pilot frequency generator.

14. The ultrasonic motor of claim 1, wherein each element to be driven is equipped with a transmitter for transmitting position and/or movement speed data to a controller.

* * * * *